Nov. 22, 1927.
H. W. BUNDY
COMPOSITE TUBING
Filed June 18, 1925
1,650,321
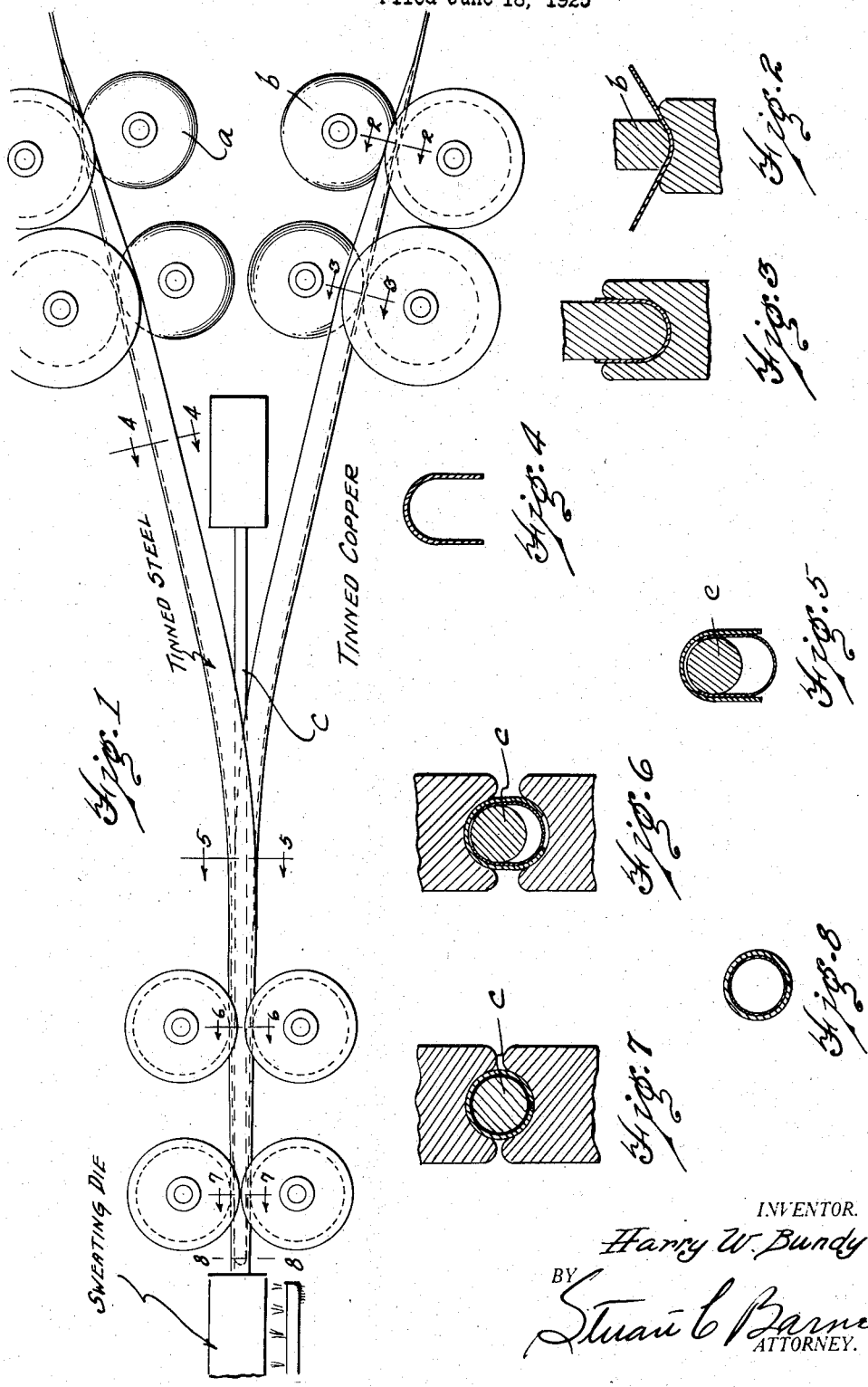
INVENTOR.
Harry W. Bundy
BY
Stuart C. Barnes
ATTORNEY.

Patented Nov. 22, 1927.

1,650,321

UNITED STATES PATENT OFFICE.

HARRY W. BUNDY, OF DETROIT, MICHIGAN.

COMPOSITE TUBING.

Application filed June 18, 1925. Serial No. 37,970.

This invention relates to a new tube of composite structure and process of producing same. In my prior Patent No. 1,431,368, issued October 10, 1922, I have described and claimed a multi-ply tube which has come to be known on the market as "Bundy tube", and is quite largely used in gas lines for automobiles and for overflow pipes in radiators, and as a general substitute for seamless tubing. It is cheaper to manufacture ordinarily than seamless tubing, and for some purposes is even better.

This Bundy tube is ordinarily made of steel, which is of course cheaper than copper and being completely tinned inside and out, is ordinarily free from the objection and liability to rust. However, some companies engaged in the manufacture of the highest quality of automobiles, or other goods, are very strict in their specification of stock liable to the objection of rust or corrosion.

It is the object of the present invention to afford a composite tube of the Bundy type which under no circumstance will be open to the objection of possible rusting. To this end I provide a tube which employs a liner of non-corrodible metal, and which has an exterior of metal that would ordinarily be liable to corrosion were it not covered with a protective coating of tin.

In the drawings:

Fig. 1 is a side elevational view of the rolls of a machine that can be used to manufacture this improved tube. The showing here is not a detailed showing, but simply a diagrammatic showing.

The remaining Figs. 2 to 8 inclusive are sections on the corresponding section lines of Fig. 1.

Instead of taking a single strip as is indicated as being the preferred method of proceeding in my prior Patent No. 1,431,368, I utilize two strips, the outer one of which is preferably tinned steel and the inner one of tinned copper. It will be understood that this strip stock will be tinned in any suitable way, preferably on both sides, but essentially it need only be tinned on one side— the outer strip on the inside and the inner strip on the outside. These two strips are passed through the forming rolls $a$ and $b$ which form them up into U shape, as shown in Figs. 2, 3 and 4. The tube then passes together where it is gathered over the usual mandrel $c$, and then rolled together as shown in Figs. 6 and 7. It then passes into a sweating die where it is sweated together as described in my prior patent, forming a multi-ply tube, in which the plies are cemented together by sweating the tinned surfaces of the plies.

The tube may be preferably composed of a very much thinner lining than the exterior ply, as the copper is relatively more expensive, in fact the copper may be .005 inches thick; this will afford a tube which will not rust when used as a carrier of water, or other corrosive liquids.

The exterior ply may be much thicker, for instance, with the copper ply of .005 of an inch, an exterior of .032 of an inch may be appropriately used. It will therefore be seen that the copper interior ply is little more than a liner which serves to protect the contents of the pipe from corroding the exterior ply which forms the real bulk of the tube. The liner also serves to close the joint where the edges of the outer ply meet. It will be seen that preferably the edges of the inner ply and the edges of the outer ply meet at diametrically opposite points on the tube.

What I claim is:

1. A composite tube which comprises inner and outer plies the inner one of which is of relatively thin non-corrodible material and the outer one of which is of relatively thick corrodible material, the said plies having been simultaneously and oppositely rolled and fitted together into tube form from substantially continuous lengths of strip stock so that the seams of the plies are on opposite sides of the tube, and the two plies and their respective seams being secured together by solder.

2. A composite tube which comprises inner and outer plies the inner one of which is of non-corrodible material and the outer one of which is of corrodible material, the said plies having been oppositely rolled into tube form from substantially continuous lengths of strip stock and interfitted with each other so that the seams are on opposite sides of the tube, the two plies and their seams being secured together by solder.

3. A composite tube which comprises inner and outer plies the inner one of which is of non-corrodible material and the outer one of which is of corrodible material, the said plies having been simultaneously rolled into tube form from substantially continuous lengths of tinned strip stock so that the longitudinal seam of one ply is opposite that of the other and the two tubes and their respective seams being secured together by reason of the tinned strip stock.

In testimony whereof I have affixed my signature.

HARRY W. BUNDY.